(12) United States Patent
Hayes et al.

(10) Patent No.: US 7,359,108 B2
(45) Date of Patent: Apr. 15, 2008

(54) DISPLAY DEVICE

(75) Inventors: Robert Andrew Hayes, Eindhoven (NL); Bokke Johannes Feenstra, Eindhoven (NL); Romaric Mathieu Massard, Communay (FR)

(73) Assignee: Liquavista B.V., AT Amstelveen (NL)

( * ) Notice: Subject to any disclaimer, the term of this patent is extended or adjusted under 35 U.S.C. 154(b) by 203 days.

(21) Appl. No.: 10/543,204

(22) PCT Filed: Jan. 12, 2004

(86) PCT No.: PCT/IB2004/050008

§ 371 (c)(1),
(2), (4) Date: Jul. 22, 2005

(87) PCT Pub. No.: WO2004/068208

PCT Pub. Date: Aug. 12, 2004

(65) Prior Publication Data

US 2006/0132404 A1    Jun. 22, 2006

(30) Foreign Application Priority Data

Jan. 27, 2003    (EP) ................................. 03100157

(51) Int. Cl.
*G02B 26/00*    (2006.01)
*G02B 26/02*    (2006.01)
*G02F 1/03*    (2006.01)
*G09G 3/34*    (2006.01)
*G09G 3/10*    (2006.01)

(52) U.S. Cl. .................. 359/296; 359/245; 359/253; 359/228; 345/32; 345/41; 345/97; 345/107; 345/84; 345/204; 345/60

(58) Field of Classification Search ................ 359/296, 359/245, 252–254, 228, 462, 463, 666; 345/6, 345/32, 41, 48, 51, 55, 60, 82, 84, 97, 107, 345/204; 349/1, 74, 84, 95, 144; 556/87, 556/465

See application file for complete search history.

(56) References Cited

U.S. PATENT DOCUMENTS

| | | | | |
|---|---|---|---|---|
| 3,972,595 | A * | 8/1976 | Romankiw et al. | 359/228 |
| 5,659,330 | A * | 8/1997 | Sheridon | 345/84 |
| 5,757,345 | A * | 5/1998 | Sheridon | 345/84 |
| 5,956,005 | A * | 9/1999 | Sheridon | 345/84 |
| 6,449,081 | B1 * | 9/2002 | Onuki et al. | 359/245 |
| 6,603,444 | B1 * | 8/2003 | Kawanami et al. | 345/32 |
| 6,747,777 | B1 * | 6/2004 | Sikora et al. | 359/253 |
| 7,158,282 | B2 * | 1/2007 | Liang et al. | 359/296 |
| 7,187,344 | B2 * | 3/2007 | Feenstra et al. | 345/6 |

FOREIGN PATENT DOCUMENTS

EP    0884714 A2    12/1998

\* cited by examiner

*Primary Examiner*—Loha Ben
(74) *Attorney, Agent, or Firm*—Nixon & Vanderhye P.C.

(57) ABSTRACT

An exemplary display device based on layer displacement having a perforated white substrate positioned close to a transparent substrate. Layer (fluid) displacement such as oil movement results in the (colored) oil film being pumped in a controlled manner above the white substrate. Fluids of three subtractive colors can be independently pumped to separate spaces. Based on the color strength of the used fluids good color rendition can be obtained for a flow channel thickness of less than 25 microns and therefore a total pixel thickness including the sub pixel reservoirs of less than 200 microns.

5 Claims, 3 Drawing Sheets

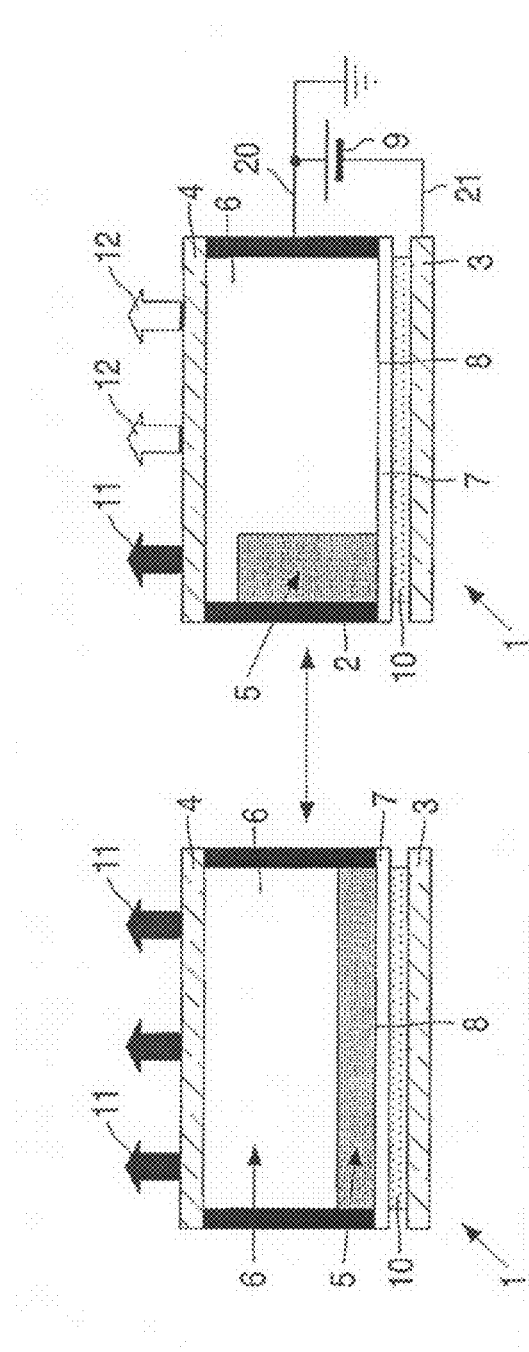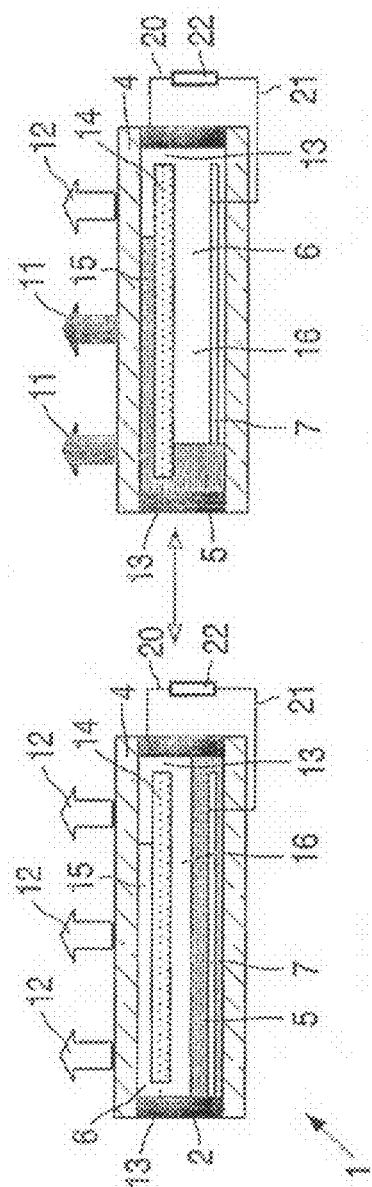

DISPLAY DEVICE

The invention relates to a display device comprising picture elements having at least one first fluid and a second fluid immiscible with each other within a space between a first transparent support plate and a second support plate, the second fluid being electroconductive or polar.

Display devices like TFT-LCDs are used in laptop computers and in organizers, but also find an increasingly wider application in GSM telephones. Instead of LCDs, for example, (polymer) LED display devices are also being used.

Apart from these display effects which are well established by now other display techniques are evolving like electrophoretic displays, which are suitable for paper white applications.

The display device according to an exemplary embodiment of the invention comprises an intermediate substrate between the first support plate and the second support plate, the intermediate substrate having a reflective surface at the side of the first support plate and being provided with at least one passage between spaces at both sides of the intermediate substrate, the device comprising means for introducing flow of the first fluid through said passage.

The invention is based on a principle called electrowetting. The invention provides new ways of using this principle.

If for instance a (first) fluid is a (colored) oil and the second (the other) fluid is water (due to interfacial tensions) a two layer system is provided which comprises a water layer on top of the oil layer. However, if a voltage is applied between the water layer and an electrode on a wall or a support plate, the stack of fluid layers is perturbed due to electrostatic forces. Since parts of the water now displace the oil layer the picture element becomes partly transparent.

Contrast is limited by the fraction of area occupied by (first) fluid ((colored) oil).

A further limitation is that a color display with a high brightness cannot be realized without special measures since each area of the display can only reflect one of the three colors desired to obtain the proper color performance. By providing spaces for each color at both sides of the intermediate substrate, with at least one passage between said spaces, one can obtain a high brightness reflective display while preventing mixing of the colored oils.

BRIEF DESCRIPTION OF THE DRAWINGS

These and other aspects of the invention are apparent from and will be elucidated with reference to the embodiments described hereinafter.

In the drawings:

FIG. 1 is a diagrammatic cross-section of a part of a display device in which the principle of electrowetting is explained FIG. 2 is a diagrammatic cross-section of a part of a display device according to the invention.

DETAILED DESCRIPTION OF EXEMPLARY EMBODIMENTS

Figure 3A:
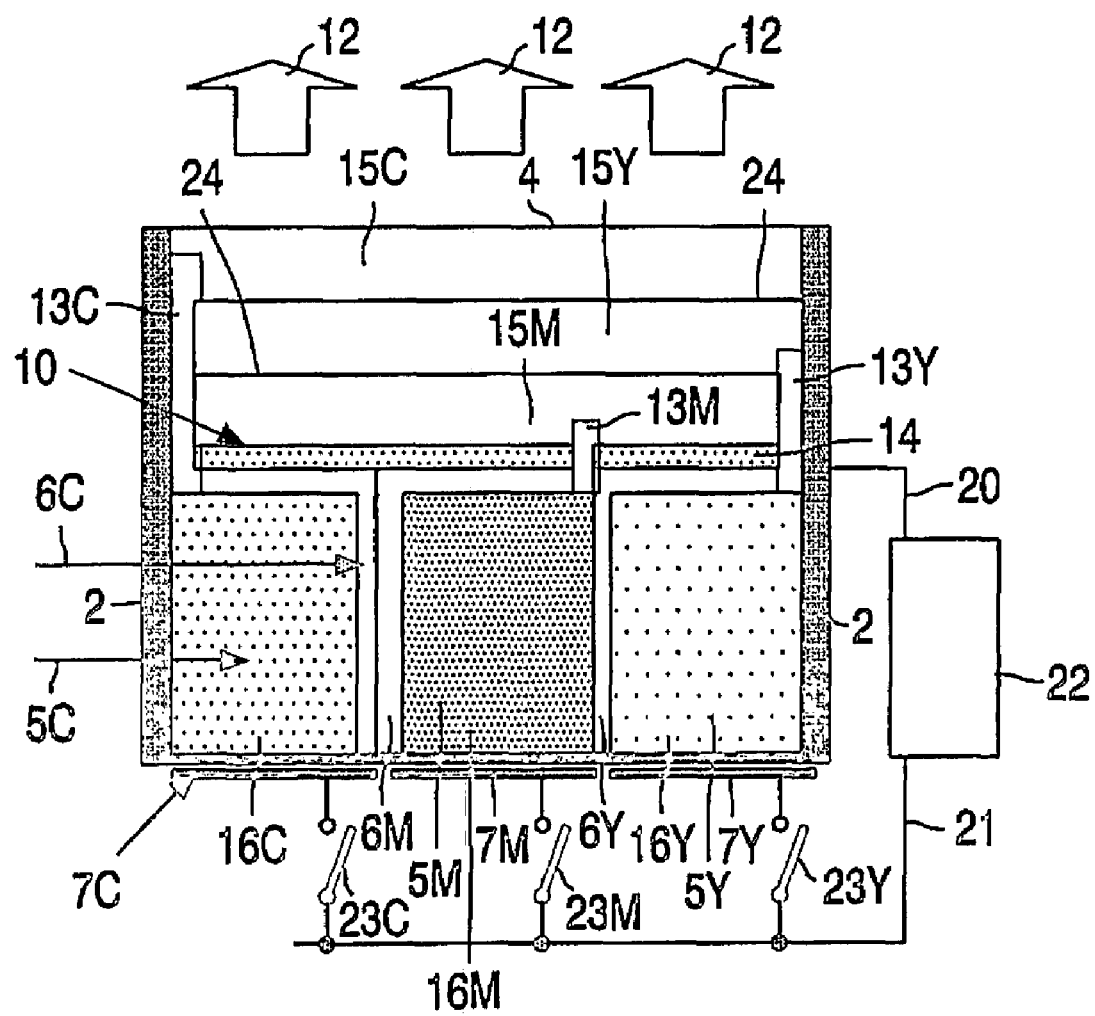
FIG. 3 is a diagrammatic cross-section of a part of a color display device according to the invention, while The Figures are diagrammatic and not drawn to scale. Corresponding elements are generally denoted by the same reference numerals.

FIG. 1 shows a diagrammatic cross-section of a part of a display device 1. Between two transparent substrates or support plates 3, 4 a first fluid 5 and a second fluid 6 are provided, which are immiscible with each other. The first fluid 5 is for instance an alkane like hexadecane or as in this example a (silicone) oil. The second fluid 6 is electroconductive or polar, for instance water or a salt solution (e.g. a solution of KCl in a mixture of water and ethyl alcohol).

In a first state, when no external voltage is applied (FIG. 1a) the fluids 5,6 adjoin the first and second transparent support plates 3, 4 of e.g., glass or plastic. On the first support plate 3 a transparent electrode 7, for example indium (tin) oxide is provided and a hydrophobic insulator layer 8, in this example an amorphous fluoropolymer (AF1600). The device further comprises a white reflector 10. When a voltage is applied (voltage source 9) between the fluid layer 6 and the transparent electrode 7 via interconnections 21, 20, displacement of the layer 5 occurs due to a phenomenon called electrowetting. As a very important aspect it was found that reversible switching between a continuous film 5 covering the support plate 3 and a film adjoining the wall 2 is achieved by means of the electrical switching means (voltage source 9).

The switching now occurs between a first state (FIG. 1a) in which (a part of the spectrum of) the light is hardly or not reflected (arrows 11) and a second state (FIG. 1b) in which a small part of the display cell does not reflect (a part of the spectrum of) the light (arrows 11), while the remainder of the display cell does reflect (white) light (arrows 12).

FIG. 2 shows a diagrammatic cross-section of a part of a display device viz. a display cell 1 according to the invention. An intermediate substrate forming a white reflector 14 now is provided between the transparent substrates or support plates 3, 4. According to the invention one or more flow channels or passage 13 are provided between spaces 15, 16 at both sides of the white reflector 14 (intermediate substrate). By introducing a voltage between the two fluid layers displacement of the layer 5 occurs again, in this case by introducing flow of the fluid 5 through one of the said passages, at least partly into the space 15 between the intermediate substrate 14 and the first supporting plate 4.

To control the direction and movement of the liquids in the flow channels or passages 13, it may be necessary to choose materials with the right surface properties for the pixel definition. For instance, one pixel wall could be hydrophilic, whereas the opposite pixel wall could be hydrophobic.

The switching now occurs between a first state (FIG. 2a) in which (white) light is reflected (arrows 12) over the full area of the display cell and a second state (FIG. 2b) in which a part of the display cell does not reflect (a part of the spectrum of) the light (arrows 11), while the remainder of the display cell does reflect (white) light (arrows 12). The area of the non-reflecting part is dependent on the voltage as supplied by driving apparatus 22 via interconnections 21, 20 and may comprise the full surface of the display cell. In this way switching between black and white is possible and the contrast between black and white as well as the brightness have improved with respect to the embodiment of FIG. 1, while at the same time the possibility of displaying analogue gray-values has been retained. In addition, this configuration has the advantages that the display cells appears white when no voltage is applied and that the viewing angle is improved further, thanks to the small thickness of the intermediate space 15.

With both display cells illustrated in FIG. 1 and FIG. 2 only a single color can be switched. A full-color display could be realized by stacking three of such display cells, whereby each of the individual cells absorbs a particular part of the spectrum of the light. This can be done for both cells shown in FIG. 1 and FIG. 2.

FIG. 3 shows a further embodiment in which a subtractive color display has been realized. In this particular examples, a display cell of a display device comprises a sub-cell for each of the colors cyan, magenta and yellow having spaces 15C, 15M, 15Y and 16C, 16M, 16Y at both sides of the white reflector 14.

Spaces 15C, 15M, and 15Y are separated physically from each other by transparent substrates 24. Also the spaces 16C, 16M and 16Y should be fabricated such that no mixing of the differently colored oils will occur. The walls separating these spaces do not necessarily have to extend the fall space 16 between the intermediate reflector 14 and the second supporting plate 3 throughout the entire cell. In fact, leaving a part of the walls high enough to contain the oils and low enough such that the second polar fluid 6 is continuous through the sub-cells will facilitate the driving of the system. The spaces 15, 16 related to one specific color are interconnected to each other via channels or passages 13C, 13M, 13Y (FIG. 3a). When no voltage is applied the spaces 15C, 15M, 15Y remain filled with the transparent polar fluid 6 and the display cell reflects (white) light (arrows 12).

Figure 3B:
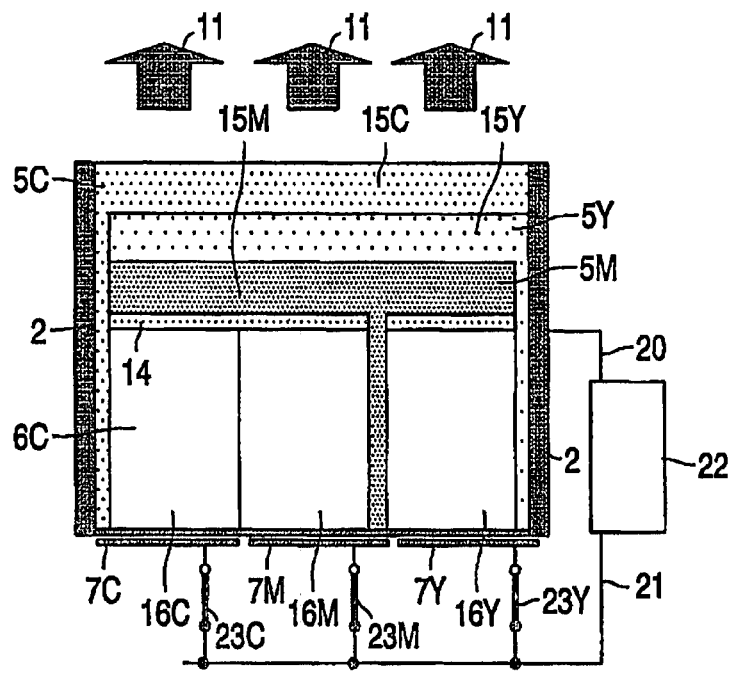
Figure 3C:
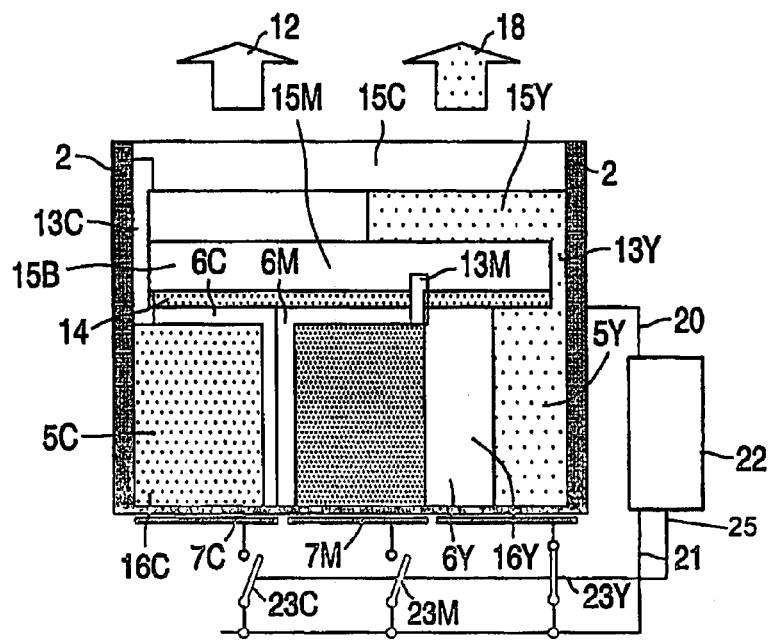

By introducing a voltage between the fluid layer 6 and the electrode on the second supporting plate 3 in each of the spaces 15C, 15M, 15Y displacement of the layers 5C, 5M, 5Y occurs again by introducing flow of the fluids 5 through said passages 13. To this end switches 23C, 23M, 23Y are controlled as shown schematically by control line 25 by driving apparatus 22 to supply driving voltages via interconnections 21, 20. If the voltage is sufficiently high the spaces 15C, 15M; 15Y are completely filled and the display reflects no light, resulting in a black state (FIG. 3b). By applying intermediate voltages, intermediate filling and therefore grey-scales can be obtained as shown schematically in FIG. 3c. Here, the electrode under space 16Y is activated by an intermediate voltage, partly filling space 15Y with liquid 6Y and the display cell partly reflects (white) light (arrows 12) and partly absorbs blue light, resulting in a light yellow color. In this way a full-color display with full gray-scale and high brightness is realized.

The three subtractive colors can be independently pumped due to the separated flow channels. Based on the color strength of the currently available oils suitable for electrowetting, good color rendition can be obtained for a flow channel thickness of less than 25 microns and therefore a total pixel thickness including the sub pixel reservoirs of less than 200 microns (not including the thickness of the active electrode layer and substrate).

Of course the invention is not limited to the embodiments as shown. For instance, if two or more of the fluids 5 are immiscible the transparent substrates 24 may be deleted. Due to the difference in mobility a stacking of the fluid layers may be introduced then by the driving scheme.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

What is claimed is:

1. A display device having a viewing side and comprising:
   picture elements having at least one first fluid and a second fluid immiscible with each other within a space between a first transparent support plate facing the viewing side and a second support plate, the second fluid being electroconductive or polar,
   an intermediate substrate between the first support plate and the second support plate, the intermediate substrate having a reflective surface at the side of the first support plate and being provided with at least one passage between spaces at both sides of the intermediate substrate, and
   an electrode arranged on the second support plate for introducing flow of the first fluid through said passage.

2. A display device according to claim 1 in which the device comprises:
   at least one further transparent substrate between the intermediate substrate and the first support plate and with at least one passage between spaces at both sides of the further transparent substrate and spaces between the intermediate substrate and the second support plate.

3. A display device according to claim 2 in which mutually separated spaces at both sides of the further transparent substrate and corresponding mutually separated spaces between the intermediate substrate and the second support plate comprise first fluids of different colors.

4. A display device according to claim 1 in which the device comprises:
   two further transparent substrates between the intermediate substrate and the first support plate, defining three spaces and with at least one passage between each of said spaces and spaces between the intermediate substrate and the second support plate.

5. A display device according to claim 4 in which mutually separated spaces at both sides of each of the two further transparent substrates and corresponding mutually separated spaces between the intermediate substrate and the second support plate comprise first fluids of different colors.

* * * * *